(12) United States Patent
Yan et al.

(10) Patent No.: US 9,917,323 B2
(45) Date of Patent: *Mar. 13, 2018

(54) DOUBLE-MEMBRANE TRIPLE-ELECTROLYTE REDOX FLOW BATTERY DESIGN

(71) Applicant: University of Delaware, Newark, DE (US)

(72) Inventors: Yushan Yan, Hockessin, DE (US); Shuang Gu, Newark, DE (US); Ke Gong, Newark, DE (US)

(73) Assignee: University of Delaware, Newark, DE (US)

( * ) Notice: Subject to any disclaimer, the term of this patent is extended or adjusted under 35 U.S.C. 154(b) by 765 days.

This patent is subject to a terminal disclaimer.

(21) Appl. No.: 13/918,444

(22) Filed: Jun. 14, 2013

(65) Prior Publication Data

US 2014/0004402 A1    Jan. 2, 2014

Related U.S. Application Data

(60) Provisional application No. 61/660,182, filed on Jun. 15, 2012.

(51) Int. Cl.
*H01M 8/20* (2006.01)
*H01M 2/40* (2006.01)
(Continued)

(52) U.S. Cl.
CPC ............ *H01M 8/20* (2013.01); *H01M 8/188* (2013.01); *H01M 2/00* (2013.01); *H01M 2/40* (2013.01);
(Continued)

(58) Field of Classification Search
CPC .... H01M 8/188; H01M 8/20; H01M 8/04186; H01M 10/4242; H01M 2300/0082;
(Continued)

(56) References Cited

U.S. PATENT DOCUMENTS 4,786,567 A * 11/1988 Skyllas-Kazacos .... H01M 4/86
                                                              429/105
5,422,197 A *  6/1995 Zito ................................ 429/51
(Continued)

FOREIGN PATENT DOCUMENTS

RU      2110118 C1    4/1998
WO    94/09522 A1    4/1994
(Continued)

OTHER PUBLICATIONS

201380031402,First_Office action .Translated),dated Jun. 2, 2016.*

(Continued)

*Primary Examiner* — Alex Usyatinsky
(74) *Attorney, Agent, or Firm* — Senniger Powers LLP

(57) ABSTRACT

A redox flow battery is provided having a double-membrane (one cation exchange membrane and one anion exchange membrane), triple-electrolyte (one electrolyte in contact with the negative electrode, one electrolyte in contact with the positive electrode, and one electrolyte positioned between and in contact with the two membranes). The cation exchange membrane is used to separate the negative or positive electrolyte and the middle electrolyte, and the anion exchange membrane is used to separate the middle electrolyte and the positive or negative electrolyte. This design physically isolates, but ionically connects, the negative electrolyte and positive electrolyte. The physical isolation offers great freedom in choosing redox pairs in the negative electrolyte and positive electrolyte, making high voltage of redox flow batteries possible. The ionic conduction drastically reduces the overall ionic crossover between negative electrolyte and positive one, leading to high columbic efficiency.

20 Claims, 10 Drawing Sheets

(51) Int. Cl.
    *H01M 10/42*     (2006.01)
    *H01M 8/18*     (2006.01)
    *H01M 8/04*     (2016.01)
    *H01M 2/00*     (2006.01)
    *H01M 8/04186*     (2016.01)

(52) U.S. Cl.
    CPC .......... *H01M 8/04* (2013.01); *H01M 8/04186* (2013.01); *H01M 8/18* (2013.01); *H01M 10/4242* (2013.01); *H01M 2300/0082* (2013.01); *Y02E 60/528* (2013.01); *Y10T 29/49108* (2015.01)

(58) Field of Classification Search
    CPC ............ H01M 2/40; H01M 2/00; H01M 8/18; H01M 8/04
    See application file for complete search history.

(56) References Cited

U.S. PATENT DOCUMENTS

| | | | |
|---|---|---|---|
| 6,475,661 B1 * | 11/2002 | Pellegri et al. | 429/105 |
| 2006/0063065 A1 * | 3/2006 | Clarke et al. | 429/105 |
| 2010/0047671 A1 | 2/2010 | Chiang et al. | |
| 2011/0045332 A1 | 2/2011 | Horne et al. | |
| 2012/0011506 A1 | 1/2012 | Iwamatsu et al. | |
| 2012/0115069 A1 * | 5/2012 | Noack et al. | 429/498 |
| 2013/0206606 A1 * | 8/2013 | Gilliam | C25B 1/00 205/351 |

FOREIGN PATENT DOCUMENTS

| | | |
|---|---|---|
| WO | 99/39397 A1 | 8/1999 |
| WO | 2010/118060 A1 | 10/2010 |

OTHER PUBLICATIONS

Ashimura, Shinichi, "Polarization Characteristics of Redox Type Fuel Cell Cathode at a Flow-Through Porous Carbon Electrode", Denki Kagaku, vol. 39 (1971) 944-948.

Cheng, Jie, "Preliminary Study of Single Flow Zinc-Nickel Battery", Electrochemistry Communications, 9, (2007), 2639-2642.

Doche, M. L., "Characterization of Different Grades of Aluminum Anodes for Aluminum/Air Batteries", Journal of Power Sources, 65, (1997), 197-205.

Leung, P. K., "Characterization of a Zinc-Cerium Flow Battery", Journal of Power Sources, 196, (2011), 5174-5185.

Li, Xianfeng, "Ion Exchange Membranes for Vanadium Redox Flow Battery (VRB) Applications", Energy & Environmental Science, 4, (2011), 1147-1160.

Skyllas-Kazacos, M., "Progress in Flow Battery Research and Development", Journal of the Electrochemical Society, 158(8), (2011), R55-R79.

Sun, Bianting, "Chemical Modification of Graphite Electrode Materials for Vanadium Redox Flow Battery Application—Part II. Acid Treatments", Electrochimica Acta, vol. 37, No. 13, (1992), 2459-2465.

Weber, Adam Z., "Redox Flow Batteries: A Review", J. Appl Electrochem, 41, (2011), 1137-1164.

Xu, Tongwen, "Ion Exchange Membranes: State of Their Development and Perspective", Journal of Membrane Science, (2005), 263, 1-29.

Yang, Zhenguo, "Electrochemical Energy Storage for Green Grid", Chemical Reviews, 111, (2011), 3577-3613.

Mohammadi, T. et al., Water transport study across commercial ion exchange membranes in the vanadium redox flow battery, Journal of Membrane Science 133 (1997) pp. 151-159.

* cited by examiner

DOUBLE-MEMBRANE TRIPLE-ELECTROLYTE REDOX FLOW BATTERY DESIGN

CROSS-REFERENCE TO RELATED APPLICATION

This application claims priority from U.S. Provisional Application No. 61/660,182, filed Jun. 15, 2012 and incorporated herein by reference in its entirety for all purposes.

GOVERNMENT SUPPORT

This invention was made with government support under Grant Nos. DE-AR000009 and DE-AR0000346 awarded by ARPA-E project of the U.S. Department of Energy. The government has certain rights in the invention.

FIELD OF THE INVENTION

The invention pertains to redox flow batteries that have a double-membrane (for example, one cation exchange membrane and one anion exchange membrane) and a triple-electrolyte (for example, one electrolyte in contact with a negative electrode, one electrolyte in contact with a positive electrode, and one electrolyte positioned between and in contact with the two membranes) as the basic characteristic.

BACKGROUND

As an electrochemical cell, a redox flow battery (RFB) is a type of rechargeable battery that stores electrical energy, typically in two soluble redox pairs contained in external electrolyte tanks. An ion-selective membrane (either cation exchange membrane, CEM, or anion exchange membrane, AEM) is used to physically separate, but ionically connect, the two electrolytes that dissolve the two redox pairs. The scale of external electrolyte stored can be sized in accordance with application requirements. When needed, liquid electrolytes are pumped from storage tanks to flow-through electrodes where chemical energy is converted to electrical energy (discharge) or vice versa (charge). Different from other conventional battery systems, RFBs store electrical energy in the flowing electrolytes. Therefore, the energy capacity and the power rating are fundamentally decoupled: The energy capacity is determined by concentration and volume of electrolytes, while the power rating is determined by the size and number of cells in stack. This unique feature, combined with its long cycle-life, low capital-cost, scalability, and independence from geographical/geological limitations that are faced by pumped hydro and compressed air technologies, makes RFB one of the most intrinsically attractive technologies in electrical energy storage, especially in the field of renewable (e.g., wind or solar) electricity generation where the intrinsic intermittency has to be dealt with.

Since the first concept of RFB was put forward about 40 years ago (in 1974), significant progress has been made and some RFB systems, e.g., the all vanadium RFB (AV-RFB), have already been commercialized. However, RFBs have not reached broad market penetration yet because many challenging problems remain unsolved. For example, the generally low energy and power density of RFB have been identified to be main drawbacks when compared with other battery systems, which means more electrolyte/electrode materials are needed when certain energy capacity/power rating is required, negatively impacting their cost-effectiveness. Attempts have been made to increase the solubility of active species by choosing alternative redox pairs or using different electrolytes, which can theoretically increase the energy density, but these efforts do not improve the power density. On the other hand, efforts have been made to improve electrode performance by using better electrode designs or utilizing more active catalysts, which can increase the power density, but not the energy density. The ideal and simple solution would be the increase of RFB's cell voltage, which could increase the energy density and power density simultaneously.

A prior art RFB system 100 is shown in FIG. 1. Negative electrolyte 30 flows through negative electrode (anode) 31 from negative electrolyte source 20 via pump 15. Positive electrolyte 40 flows through positive electrode (cathode) 41 from positive electrolyte source 25 via pump 16. Positive electrode 40 and negative electrode 30 are separated by a single ion selective membrane 28. The RFB 100 may be connected to a grid input/output processor 10.

The cell voltage is simply determined by the two redox pairs used, and often the cation-based redox pairs (e.g., $Co^{3+}/Co^{2+}$ redox pair with +1.953 V standard electrode potential and $Ce^{4+}/Ce^{3+}$ one with +1.743 V, all the quoted potential values here and hereinafter calculated based on standard thermodynamic conditions) have more positive electrode potentials (ideally for the positive electrode of RFB) and the anion-based ones (e.g., $Al(OH)_4^-/Al$ with −2.337 V and $Zn(OH)_4^{2-}/Zn$ with −1.216 V) have more negative electrode potentials (ideally for the negative electrode). The use of a single ion-selective membrane, either a cation exchange membrane (CEM) or anion exchange membrane (AEM), in current RFB systems theoretically requires the same ionic type of redox pairs in both positive and negative sides: either all cation-based redox pairs (when AEM used) or all anion-based ones (when CEM used), fundamentally limiting their cell voltages. For example, the earliest RFB system, i.e., the iron-chromium RFB system (Fe/Cr-RFB, $[(Fe^{3+}/Fe^{2+})/(Cr^{3+}/Cr^{2+})]$ with +1.18 V standard cell voltage) and the currently most popular RFB, i.e., the AV-RFB system $([(VO_2^+/VO^{2+})/(V^{3+}/V^{2+})]$ with +1.26 V) both belong to the all-cation-based RFB systems. The polysulphide-bromine RFB system (S/Br-RFB, $[(S_4^{2-}/S_2^{2-})/(Br_3^-/Br^-)]$ with +1.36 V) is a typical all-anion-based RFB. Besides, the single ion-selective membrane also requires the same or similar (e.g., having the same cation but different anions when an AEM used, or having the same anion but different cations when a CEM used) supporting (or background) electrolyte in positive side and negative one, which sometimes limits the choices of redox pairs and further narrows the available range of cell voltages. For example, although the zinc-cerium RFB system (Zn/Ce-RFB, $[(Zn^{2+}/Zn)/(Ce^{4+}/Ce^{3+})]$) can offer as high as 2.50 V standard cell voltage (the highest number reported among all known aqueous RFB systems), it suffers a great hydrogen evolution problem in negative side ($Zn^{2+}/Zn$). The reason is that the acidic supporting electrolyte used (in both sides) creates a huge over-potential (760 mV) for hydrogen evolution reaction (0 V standard electrode potential of $H^+/H_2$ at pH 0 vs. and −0.760 V standard electrode potential of $Zn^{2+}/Zn$).

In addition, the use of single ion-selective membrane makes the RFB systems suffer from an irreversible counter-ion crossover that is another challenging problem, because all ion-selective membranes are not perfect. They allow a very low, but measurable, rate of permeation of counter-ions through them (typically, 1% anion crossover for CEMs and 1%-5% cation crossover for AEMs). When the counter-ions cross over the membrane, they will immediately react with the redox pairs in the other side of electrolyte (so-called self-discharging) and never come back, resulting a loss in Coulombic efficiency, permanently reduction of energy capacity, and contamination of two electrolytes which will greatly influence the performance of either side.

Thus, a suitable alternative to a single ion-selective membrane RFB system is needed.

BRIEF SUMMARY OF THE INVENTION

In an aspect, the invention provides a novel redox flow battery design, e.g., a double-membrane, triple-electrolyte (DMTE) based redox flow battery design, comprising a first membrane; a second membrane; a first electrolyte positioned between and in contact with the first membrane and the second membrane; a second electrolyte in contact with the first membrane and a first electrode; and a third electrolyte in contact with the second membrane and a second electrode; and wherein the first electrolyte and second electrolyte are different in term of at least one species of anion, and the first electrolyte and third electrolyte are different in terms of at least one species of cation; and wherein the first electrode is a negative electrode (or a positive electrode) and the second electrode is a positive electrode (or a negative electrode); and wherein the first membrane and/or the second membrane is selected from the group consisting of a cation exchange membrane and an anion exchange membrane.

Another embodiment of the invention pertains to a redox flow battery comprising: a cation exchange membrane having a first surface and a second surface; an anion exchange membrane having a first surface and a second surface; a first electrolyte positioned between and in contact with the first surface of the cation exchange membrane and the first surface of anion exchange membrane; a second electrolyte in contact with the second surface of the cation exchange membrane and a first electrode (e.g., a negative electrode); and a third electrolyte in contact with the second surface of the anion exchange membrane and a second electrode (e.g., a positive electrode).

In another aspect, the second electrolyte comprises an anion-based redox pair, such as an anion-redox pair selected from the group consisting of an $Al(OH)_4^-/Al$ redox pair, a $Zn(OH)_4^{2-}/Zn$ redox pair and a $Co(CN)_6^{3-}/Co(CN)_6^{4-}$ redox pair. In another aspect, the third electrolyte comprises a cation-based redox pair, such as a cation-based redox pair selected from the group consisting of a $Co^{3+}/Co^{2+}$ redox pair and a $Ce^{4+}/Ce^{3+}$ redox pair. In another aspect, one of the first, second and third electrolytes comprises at least one of: cations based on hydronium, sodium, magnesium, potassium or calcium; or anions based on hydroxide, perchlorate, sulfate, phosphate, acetate, chloride, bromide or carbonate.

In yet another aspect, the invention provides a method of making a redox flow battery comprising: partially surrounding a first electrolyte with a first membrane and a second membrane; b) partially surrounding a second electrolyte with the first membrane and a first electrode; and partially surrounding a third electrolyte with the second membrane and a second electrode; wherein the first membrane and/or the second membrane is selected from the group consisting of a cation exchange membrane and an anion exchange membrane. In yet a further aspect, the invention provides a battery made by this method.

DETAILED DESCRIPTION OF THE INVENTION

Figure 1:
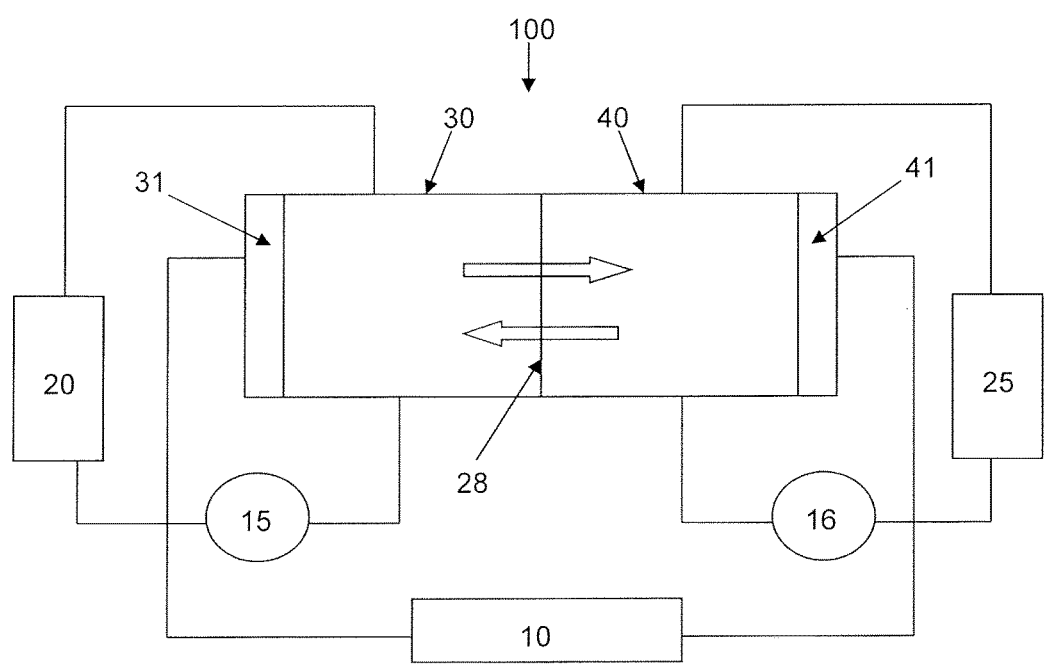
FIG. 1 shows a conventional single-membrane double-electrolyte RFB.

The present invention will now be described in detail with reference to a few preferred embodiments thereof. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The double membrane, triple electrolyte (DMTE) RFB systems described herein can dramatically increase cell voltages and decrease ionic crossover simultaneously by involvement of a double-membrane arrangement (one piece of CEM and one piece of AEM) that divides the RFB cell into three compartments filled with triple-electrolyte (one in contact with a negative electrode, one in contact with a positive electrode, and the third one in between the two membranes). By introducing one more ion-selective membrane, the two electrolytes in the negative side and the positive side can be substantially separated but still remain ionically conductive by the third electrolyte positioned between the membranes. This particular three-compartment design favorably brings great freedom in selecting redox pairs as well as their supporting electrolytes for both the negative side and the positive side, making high cell voltage RFBs possible. Besides providing the function of ionic conduction, the middle electrolyte in between also serves as a great "buffer" that can significantly reduce the overall counter-ion crossover between the negative side and the positive side, fundamentally solving the electrolyte contamination problem and providing great convenience for electrolyte separation and rebalance.

Specifically, the double-membrane triple-electrolyte design described herein allows for a strongly basic negative electrolyte (high pH, e.g. at least 8, at least 9, at least 10 or higher) and a strongly acidic positive electrolyte (low pH, e.g., not more than 6, not more than 5, not more than 4 or lower) to be used at the same time in the same redox flow battery, where a neutral middle electrolyte is in between. As a result, very negative redox pairs that are usually only stable in basic electrolytes and very positive ones that are usually only stable in acidic electrolytes can be simultaneously incorporated into the DMTE-RFB, providing very high cell voltage and very low ionic crossover at the same time. Not only can the cell voltage be increased, the side reaction of hydrogen evolution in negative electrode can also be suppressed, as the standard electrode potential for hydrogen evolution reaction is very negatively shifted in a basic electrolyte in comparison with an acidic electrolyte (e.g., from 0 V at pH=0 to −0.828 V at pH=14), thermodynamically extending the operational window of cell voltage. Such a low counter-ionic crossover design overcomes the very challenging electrolyte contamination problems that hamper the commercial use of most of the current batteries.

Figure 2:
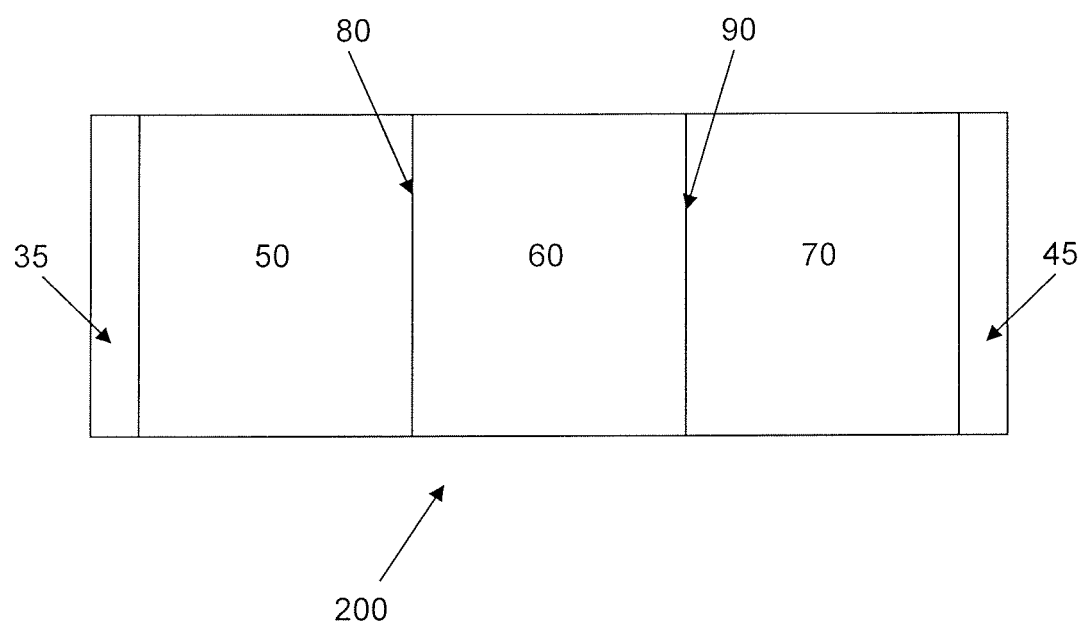
FIG. 2 shows an illustration of a double-membrane triple-electrolyte (DMTE) RFB concept.

FIG. 2 shows a DMTE-RFB system 200 wherein first electrolyte 60 may be partially surrounded by a second electrolyte 50 and a third electrolyte 70, wherein first electrolyte 60 may be separated from second electrolyte 50 by a first membrane 80, such as a cation exchange membrane (CEM) 80, and wherein first electrolyte 60 may be separated from third electrolyte 70 by a second membrane 90, such as an anion exchange membrane (AEM) 90. Second electrolyte 50 may be partially surrounded by a first electrode 35, such as a negative electrode (anode) 35. Third electrolyte 70 may be partially surrounded by a second electrode 45, such as a positive electrode (cathode) 45.

Figure 3:
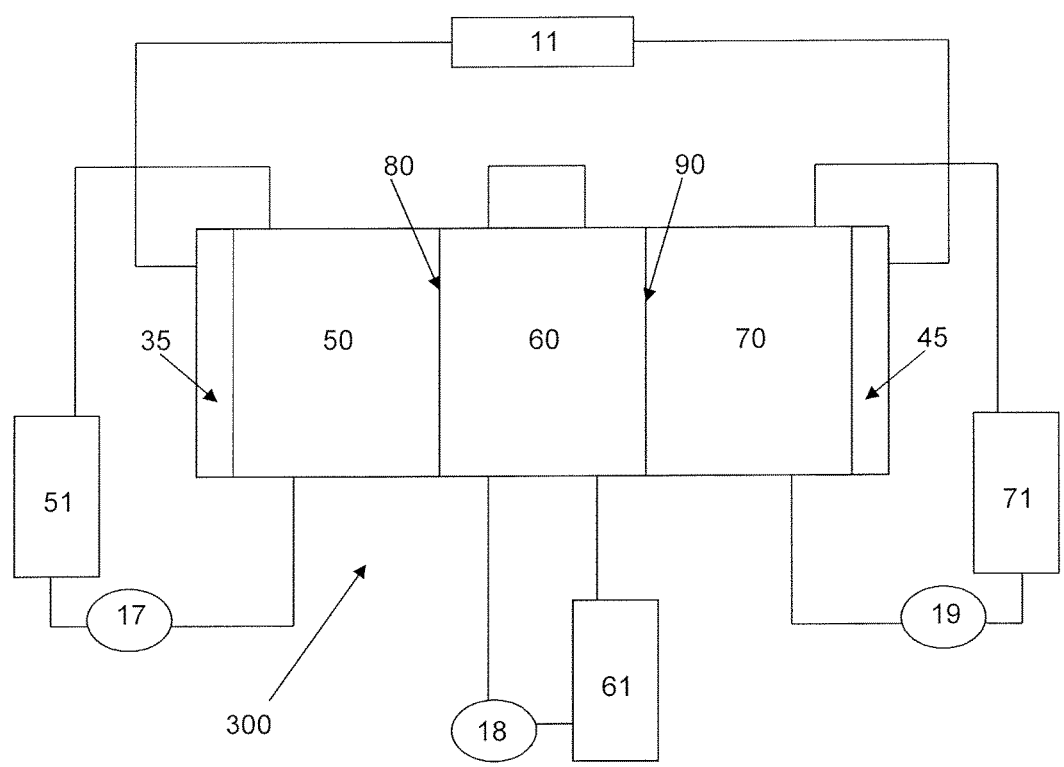
FIG. 3 shows a double-membrane triple-electrolyte RFB.

FIG. 3 shows a DMTE-RFB 300 herein, and similar to FIG. 2, first electrolyte 60 may be partially surrounded by a second electrolyte 50 and a third electrolyte 70, wherein first electrolyte 60 may be separated from second electrolyte 50 by a first membrane 80, such as a cation exchange membrane (CEM) 80, and wherein first electrolyte 60 may be separated from third electrolyte 70 by a second membrane 90, such as an anion exchange membrane (AEM) 90. Second electrolyte 50 may be partially surrounded by a first electrode 35, such as a negative electrode (anode) 35. Third electrolyte 70 may be partially surrounded by a second electrode 45, such as a positive electrode (cathode) 45. Second electrolyte 50 is flowed from second electrolyte source 51 via pump 17. Third electrolyte 70 is flowed from third electrolyte source 71 via pump 19. First electrolyte 60 is flowed from first electrolyte source 61 via pump 18. DMTE-RFB 300 may be connected to a grid input/output processor 11.

It will be understood to those skilled in the art that elements 35 and 45 are referred as electrodes, but they may also include current collectors (not shown). The current collectors may be the same or different material as the electrodes. It will be understood to those skilled in the art that electrodes/current collectors 35, 45 may have high specific surface area (e.g., be highly porous).

First, second and third electrolytes 60, 50, 70 are not particularly limited and may comprise any suitable electrolyte or salt, such as those based on cations of hydronium, sodium, magnesium, potassium or calcium, or anions based on hydroxide, perchlorate, sulfate, phosphate, acetate, chloride, bromide or carbonate. First and second electrodes 35, 45 are not particularly limited and may comprise any suitable electrode material, such as Al, Zn, Cu, Cd, Pb and C.

The DMTE-RFB systems described herein have great advantages over conventional single-membrane, double-electrolyte RFBs and offers high OCV, low ionic crossover, and suppressed hydrogen evolution. The materials used to construct the DMTE battery systems described herein are not particularly limited and may be a myriad of materials, for example, any materials selected from conventional or otherwise known materials used for similar purposes in the energy arts. Such materials include, but are not limited to, cation exchange membranes, anion exchange membranes, electrolyte solutes and solvents, compounds capable of providing the desired redox pairs, acids, bases, negative electrodes, positive electrodes, and the like. The DMTE-RFB systems described herein have a wide range of applications, especially for high voltage and low ionic crossover RFBs.

Figure 4:
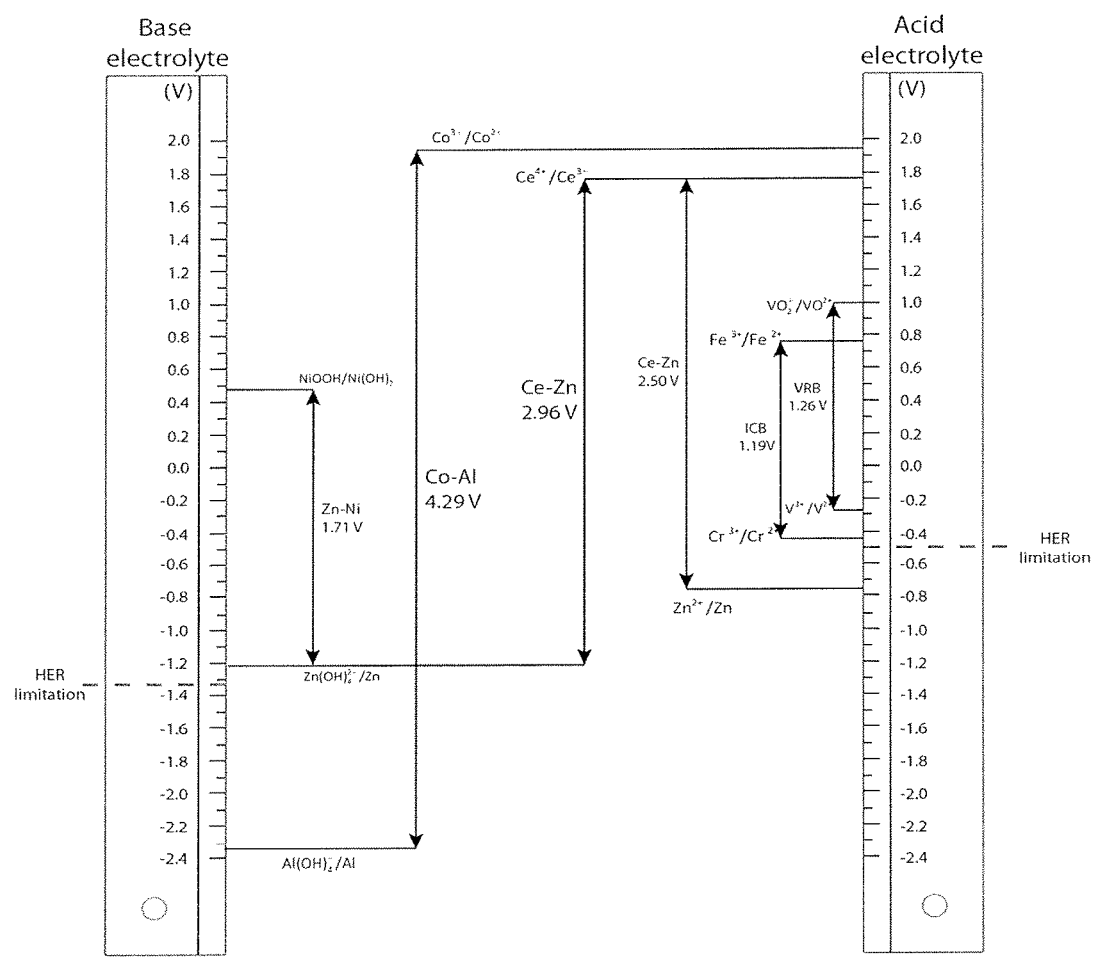
FIG. 4 shows a standard electrode potential for some redox pairs and cell voltage for different batteries.

For example, an attractive candidate for a RFB system is an aluminum-cobalt DMTE-RFB system (e.g., Al/Co-DMTE-RFB), configured as $[(Al/Al(OH)_4^-)//(Co^{3+}/Co^{2+})]$. When compared to FIG. 2 or 3, the Al portion of the Al/Co-DMTE-RFB is comprised in second electrolyte 50 and the Co portion of the Al/Co-DMTE-RFB is comprised in third electrolyte 70. The Al/Co-DMTE-RFB system offers a very high cell voltage (4.29 V standard cell voltage), as it successfully combines the very negative redox pair of $Al/Al(OH)_4^-$ (−2.337 V standard electrode potential) in base and the very positive redox pair of $Co^{3+}/Co^{2+}$ (+1.953 V standard electrode potential) in acid. Such a high standard cell voltage (4.29 V) is believed to be the highest one reported among all known RFB systems, which value is 1.7 times that of Zn/Ce-RFB systems (2.50 V), 3.2 times that of Polysulfide-bromide S/Br-RFB systems (1.36 V), 3.4 times that of All-Vanadium RFB systems (1.26 V), and 3.6 times that of Iron-Chromium Fe/Cr-RFB systems (1.18 V), as shown in FIG. 4. The very high standard cell voltage of the Al/Co-DMTE-RFB system is even higher than that of lithium ion batteries (around 3.5 V), suggesting a great potential of the design to rival other RFB technologies.

Figure 5:
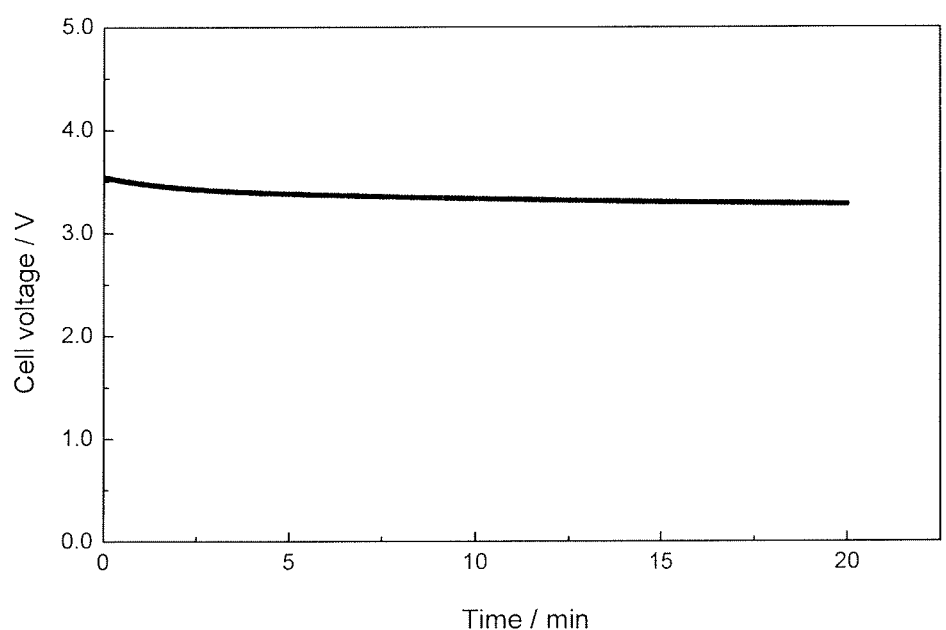
FIG. 5 shows the open circuit voltage of an Al/Co-DMTE-RFB.
Figure 6:
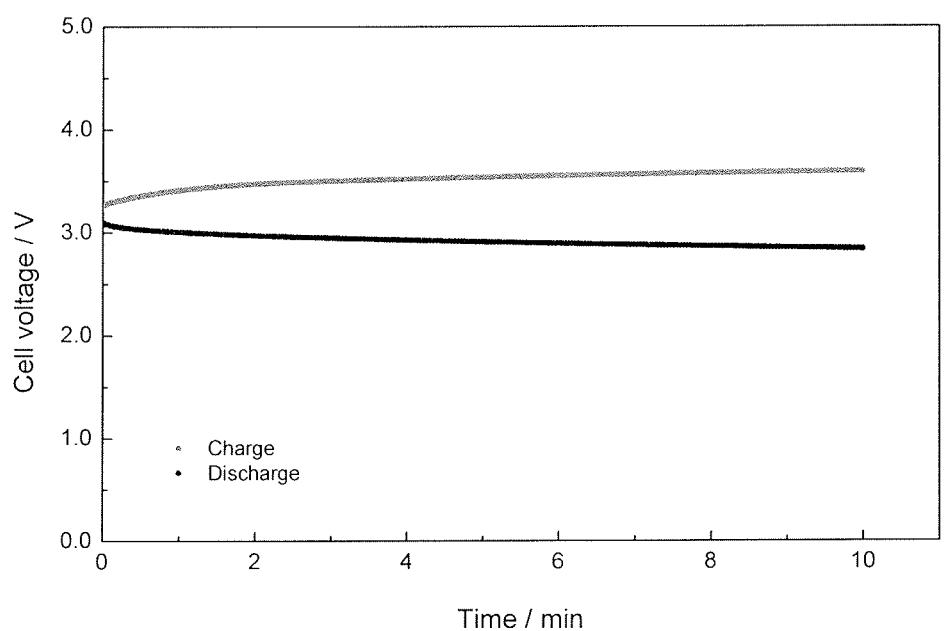
FIG. 6 shows the charge and discharge curves of an Al/Co-DMTE-RFB.

The test of open circuit voltage (OCV) for the Al/Co-DMTE-RFB system is shown in FIG. 5. As can be seen, a high initial OCV (3.54 V) and a stable OCV (3.28 V) after 20 min is realized. Considering the very sluggish kinetics observed for the $Co^{3+}/Co^{2+}$ redox pair previously and the completely non-optimized electrodes used, these OCV data are believed to be fairly consistent with the standard cell voltage (4.29 V). Additionally, the Al/Co-DMTE-RFB system is functional, as shown by the charge/discharge curves of FIG. 6. The expected discharge reactions and charge reactions are shown in Eq. 1 and Eq. 2, respectively.

$$Co^{3+} + e^- \rightarrow Co^{2+} \qquad \text{Eq. 1 (a)}$$

$$Al + 4OH^- \rightarrow Al(OH)_4^- + 3e^- \qquad \text{Eq. 1 (b)}$$

$$Co^{2+} \rightarrow Co^{3+} + e^- \qquad \text{Eq. 2 (a)}$$

$$Al(OH)_4^- + 3e^- \rightarrow Al + 4OH^- \qquad \text{Eq. 2 (b)}$$

For the discharge process (the lower curve in FIG. 6), the cell voltage slightly and smoothly decreases from the initial 3.11 V to 2.84 V for 10 min of discharge. An even longer time of discharge is also possible although only 10 min of discharge operation is shown here as a preliminary experiment. The charge process has also been tried, and the cell voltage increases from the initial 3.25 V to 3.59 V for 10 min of charge (upper curve of FIG. 6). Clearly, the experimental demonstration of the Al/Co-DMTE-RFB system confirms that such a design is feasible and successful.

For example, another attractive candidate for a RFB system is a zinc-cerium DMTE-RFB system (Zn/Ce-DMTE-RFB), configured as $[(Zn/Zn(OH)_4^{2-})//(Ce^{4-}/Ce^{3+})]$. When compared to FIG. 2 or 3, the Zn portion of the Zn/Ce-DMTE-RFB is comprised in second electrolyte 50 and the Ce portion of the Zn/Ce-DMTE-RFB is comprised in third electrolyte 70.

The Zn/Ce-DMTE-RFB system offers a standard cell voltage of 2.96 V, as it combines the negative electrode potential (−1.216 V) from the $Zn/Zn(OH)_4^{2-}$ redox pair and the positive one (+1.743 V) from the $Ce^{4+}/Ce^{3+}$ redox pair.

Such a high standard cell voltage is also higher than those of all conventional aqueous RFB systems, e.g., higher than that of AV-RFB system (1.26 V) and that of Zn/Ce-RFB system (2.50 V, in spite of the strong concern of hydrogen evolution in negative electrode for Zn/Ce-RFB system). The discharge and charge reactions are represented in Eq. 3 and Eq. 4, respectively.

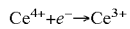

Eq. 3 (a)

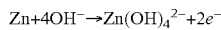

Eq. 3 (b)

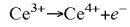

Eq. 4 (a)

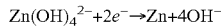

Eq. 4 (b)

During charge process, the zincate anions are reduced to zinc metal and the sodium cations are balanced from the middle compartment to the negative compartment. In the meanwhile, cerium(III) cations are oxidized into cerium(IV) and the perchlorate anions are balanced from the middle compartment to the positive compartment. During the discharge process, the opposite reactions and ion transfer directions will apply.

Figure 7:
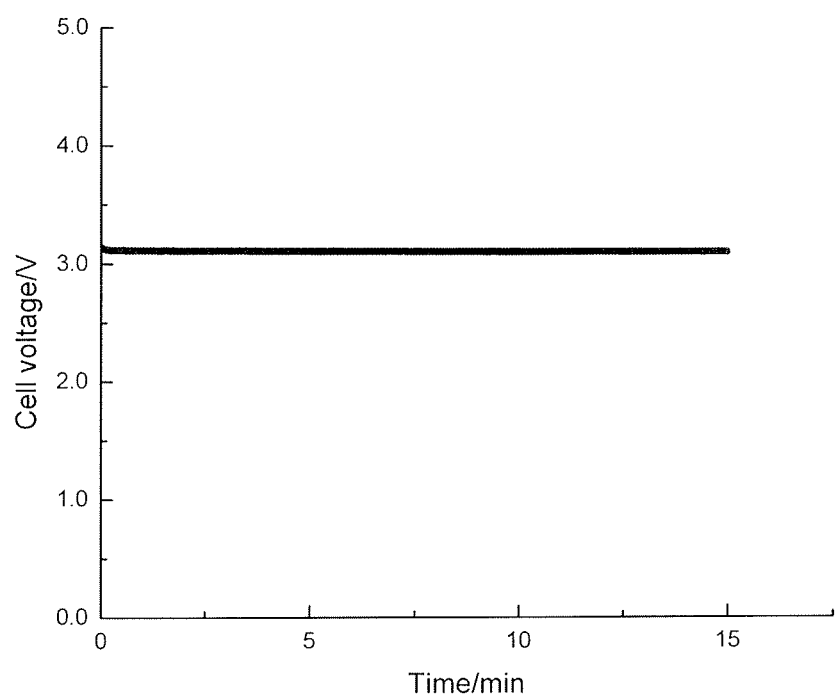
FIG. 7 shows the open circuit voltage of a Zn/Ce-DMTE-RFB.

After being charged to reach a state of charge of 90%, the OCV is monitored for 15 minutes. As seen in FIG. 7, it shows an initial OCV of 3.14 V and quickly stabilizes to 3.10 V. These OCVs are higher than the standard one (2.96 V), which is reasonable since the cell is in charged state (90% of state of charge). Clearly, such a high observed OCV again confirms and verifies that the DMTE-RFB system is feasible and successful.

Figure 8:
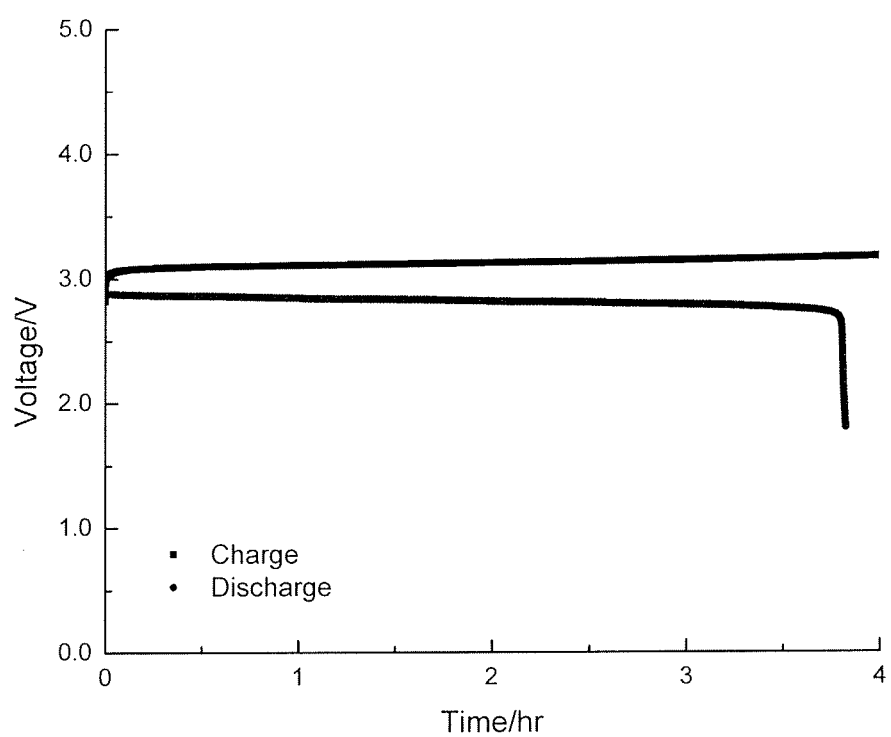
FIG. 8 shows the charge and discharge curves of a Zn/Ce-DMTE-RFB.

Equally important, both a discharge operation and a charge operation have been successfully achieved with a constant current (60 mA current or 5 mA/cm² current density). As seen in FIG. 8, the cell voltage, in the charge operation (upper curve of FIG. 8), slightly and very smoothly increases from initial 3.08 V to 3.17 V after 30 min of charge, indicating very high voltage efficiency (93%-96%). Different from the conventional Zn/Ce-RFB system where hydrogen evolution was found to be a strong concern (760 mV over-potential when acidic electrolyte used), the hydrogen evolution reaction is greatly suppressed in the Zn/Ce-DMTE-RFB system of the present invention as its over-potential drops from 760 mV in Zn/Ce-RFB to 388 mV in the inventive Zn/Ce-DMTE-RFB system (−1.216 V of Zn/Zn(OH)$_4^{2-}$ redox pair vs. −0.828 V of OH$^-$/H$_2$ at pH=14). Indeed, the hydrogen evolution phenomenon has not been found during the whole discharge operation as well as during the charge operation. In the discharge operation (lower curve of FIG. 8), the cell voltage decreases from the initial 2.88 V to 2.72 V after nearly 4 hours of discharge, showing a very steady voltage region, and then drops sharply after available species being mostly consumed. The voltage efficiency for discharge ranges from 92%-97%, almost equivalent to this number for charge.

The discharge duration lasts for 3 hours and 56 minutes, very close to the charge duration 4 hours, indicating high Coulombic efficiency. The overall Coulombic efficiency, voltage efficiency and energy efficiency are calculated in Table 1. Combining the increased cell voltage, decreased ionic crossover, and suppressed hydrogen evolution, the Zn/Ce-DMTE-RFB system of the present invention is clearly superior to the conventional Zn/Ce-RFB system.

TABLE 1

| Efficiency calculation for one charge-discharge cycle | | | | | | |
|---|---|---|---|---|---|---|
| Discharge time (s) | Charge time (s) | Average discharge Voltage (V) | Average charge voltage (V) | Columbic efficiency | Voltage efficiency | Energy efficiency |
| 13777 | 14400 | 2.82 | 3.12 | 96% | 90% | 86% |

Figure 9:
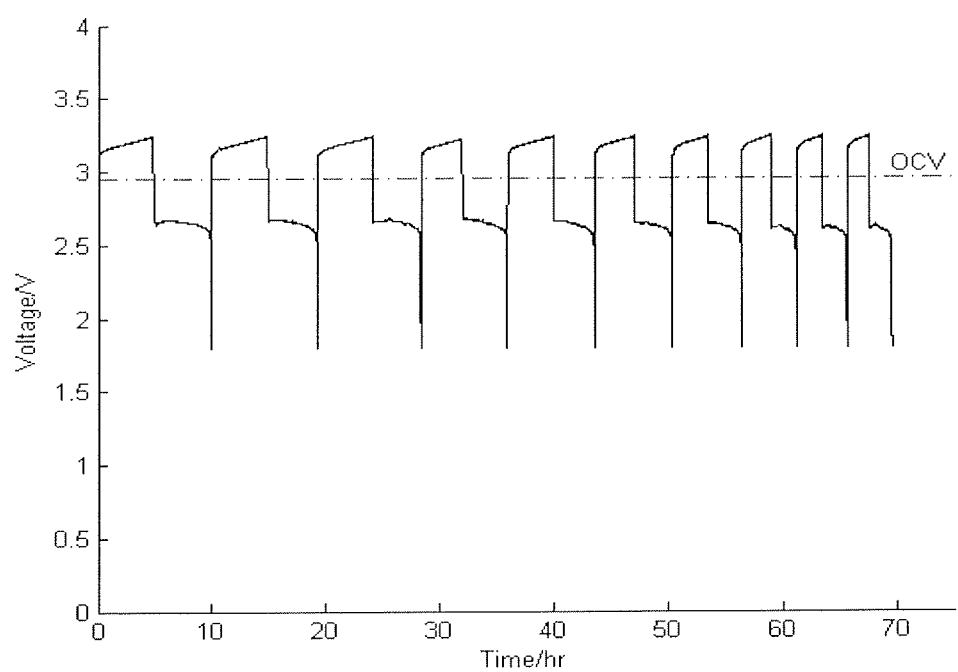
FIG. 9 shows a continuous charge-discharge test of a Zn/Ce-DMTE-RFB for 10 cycles.
Figure 10:
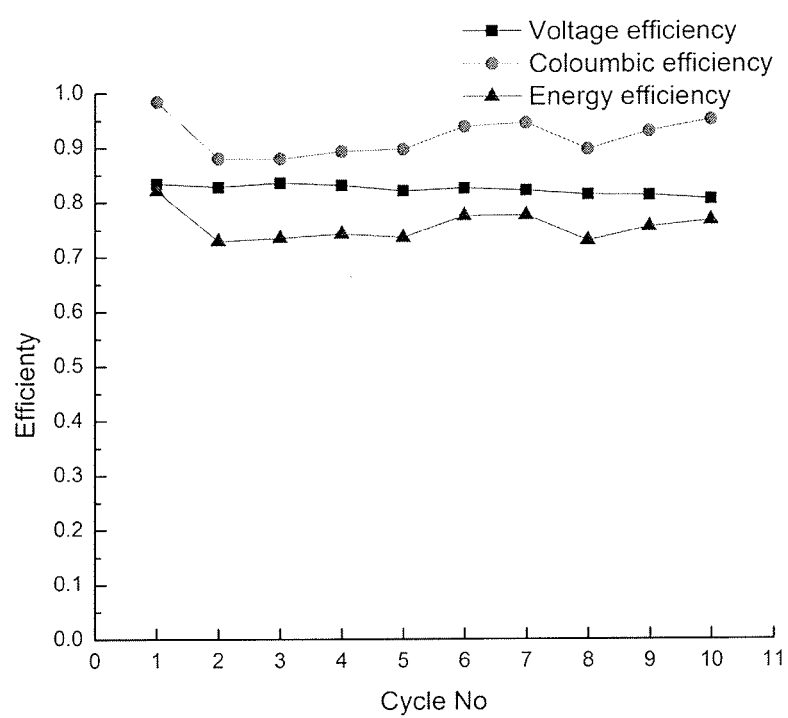
FIG. 10 shows the efficiency calculation of a Zn/Ce-DMTE-RFB for each cycle.

The charge-discharge voltage curve at 5 mA/cm² is shown in FIG. 9, showing 10 successful continuous cycles without obvious Coulombic efficiency, voltage efficiency and energy efficiency change (as shown in FIG. 10 of efficiency for each cycle).

Example 1

An aluminum-cobalt DMTE-RFB system (Al/Co-DMTE-RFB), configured as [(Al/Al(OH)$_4^-$)//(Co$^{3+}$/Co$^{2+}$)] was constructed. A three-compartment cell made up of three plastic jars was designed and used as follows. Three 50 ml plastic jars were put in series with a hole (a quarter inch of diameter) opened between adjacent two jars. The three jars, based on half-reaction inside, were assigned as negative, middle and positive compartments. One piece of Nafion® 212 membrane (DuPont, 50 μm thickness) and one piece of Fumasep® FAA membrane (FuMa-Tech, 70 μm thickness) were used as the CEM and AEM, respectively. The CEM is put between the negative compartment and the middle compartment while the AEM is put between the middle compartment and the positive compartment, along with an O-ring to seal the conjunction part. Two clamps were used to compress three jars tightly to avoid electrolyte leakage. A potentiostat/galvanostat (Solartron 1287A) was used in both OCV and discharge-charge cycle tests.

A solution that contained 3.76 M NaOH, 0.24 M NaAlO$_2$ and 0.05 M NaSnO$_2$ was used as the negative electrolyte. A solution that contained 0.1 M Co(ClO$_4$)$_2$ and 2 M HClO$_4$ was used as the positive electrolyte, which was prepared by dissolving CoCO$_3$ into perchloric acid. A 4 M NaClO$_4$ solution was used as the middle supporting electrolyte. A small piece of Al strip (ESPI Metals, 2 cm by 3 cm, 5N grade) and a small piece of graphite felt (SGL Group, 2 cm by 3 cm, Sigracell® GFA5 EA type) were used as the negative electrode and the positive electrode, respectively. The cell was first charged at 50 mA (or 8.3 mA/cm² of current density) for 2.5 hours and the OCV was tested for 20 min. The discharge-charge cycle is then carried out for 20 min by setting current constant at 5 mA (or 0.83 mA/cm² of current density).

Example 2

A zinc-cerium DMTE-RFB (Zn/Ce-DMTE-RFB), configured as [(Zn/Zn(OH)$_4^{2-}$)//(Ce$^{4+}$/Ce$^{3+}$)] was constructed. A three-compartment cell made up of three acrylic flow channels was designed and used as follows. Three 5 cm by 6 cm rectangular channels were put in series with membranes in between. The three channels, based on half-reaction inside, were assigned as negative, middle and positive compartments. One piece of Nafion® 1135 membrane (DuPont, 87.5 µm thickness) and one piece of Fumasep® FAA membrane (FuMa-Tech, 70 µm thickness) were used as the CEM and AEM, respectively. The CEM is put between the negative compartment and the middle compartment while the AEM is put between the middle compartment and the positive compartment, along with silicone gasket to seal the conjunction part. The positive electrode and negative electrode are each put next to its corresponding compartment, respectively. Two clamps were used to compress the three channels and electrodes tightly to avoid electrolyte leakage. Electrolytes are stored outside the channel in three tanks and delivered by peristaltic pump (Masterflex® L/S® 100 RPM). The working flow battery set-up is a potentiostat/galvanostat (Solartron 1287A) and was used in both OCV and discharge-charge cycle tests.

The negative electrolyte contained 3 M NaOH and 0.5 M $Na_2[Zn(OH)_4]$. A solution that contained 0.5 M $Ce(ClO_4)_3$, 2 M $HClO_4$ was used as the positive electrolyte, which was prepared by dissolving $Ce_2(CO_3)_3$ into perchloric acid. The middle electrolyte used was 4 M $NaClO_4$ solution. The volume for each electrolyte used in test is 30 ml. A rectangular copper plate (ESPI Metals, 5 cm by 6 cm, 3N grade) was used as negative current collector. Before the experiment, the copper was rinsed with acetone and deposited with a layer of cadmium according to the method in reference. Graphite based bipolar plate (SGL group, 5 cm by 6 cm, Sigracet® TF6 type) was used as positive current collector. Graphite felt (SGL Group, 3 cm by 4 cm, Sigracell® GFA5 EA type) was used as positive electrode and compressed by plastic frame to contact bipolar plate. The cut-off voltage for charge and discharge are 3.24 and 1.8 respectively. The discharge-charge cycle was carried out at constant current density at 60 mA (or 5 mA/cm² of current density) with flow rate for all three electrolytes at 20 ml/min.

The DMTE-RFB systems described above may have other configurations besides those of acid/neutral/base configurations and are not limited thereto. Hydroxide ions play the role of ligand to tune the electrode potential of, for example, a Zn(II)/Zn or Al(III)/Al system, more negative. Various ligands and central ions may be used for a similar role and may be combined and implemented in a DMTE-RFB system. Table 2 lists some possible candidates and combinations of negative, middle and positive electrolyte.

While this invention has been described in terms of several preferred embodiments, there are alterations, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A redox flow battery comprising:
    a) a cation exchange membrane having a first surface and a second surface;
    b) an anion exchange membrane having a first surface and a second surface;
    c) a first electrolyte positioned between and in contact with the first surface of the cation exchange membrane and the first surface of the anion exchange membrane;
    d) a second electrolyte in contact with the second surface of the cation exchange membrane and a first electrode; and
    e) a third electrolyte in contact with the second surface of the anion exchange membrane and a second electrode, wherein: the first electrolyte is not in contact with any electrode in its complete flow path; the first electrolyte and second electrolyte are different in terms of at least one species of anion; the first electrolyte and third electrolyte are different in terms of at least one species of cation; and the redox flow battery is a rechargeable battery that is capable of both generating and storing electrical energy.

2. The redox flow battery of claim 1, wherein the second electrolyte is more basic than the first electrolyte, and the first electrolyte is more basic than the third electrolyte.

3. The redox flow battery of claim 2, wherein the second electrolyte comprises an anion-based redox pair or a cation-based redox pair.

4. The redox flow battery of claim 2, wherein the second electrolyte comprises an $Al(OH)_4^-/Al$ redox pair, a $Zn(OH)_4^{2-}/Zn$ redox pair or a $Co(CN)_6^{3-}/Co(CN)_6^{4-}$ redox pair.

5. The redox flow battery of claim 2, wherein the third electrolyte comprises an anion-based redox pair or a cation-based redox pair.

6. The redox flow battery of claim 2, wherein the third electrolyte comprises a $Co^{3+}/Co^{2+}$ redox pair or a $Ce^{4+}/Ce^{3+}$ redox pair.

7. The redox flow battery of claim 2, wherein the second electrolyte comprises an $Al(OH)_4^-/Al$ redox pair and the third electrolyte comprises a $Co^{3+}/Co^{2+}$ redox pair.

8. The redox flow battery of claim 2, wherein the second electrolyte comprises a $Zn(OH)_4^{2-}/Zn$ redox pair and the third electrolyte comprises a $Ce^{4+}/Ce^{3+}$ redox pair.

9. The redox flow battery of claim 2, wherein the second electrolyte comprises a $Co(CN)_6^{3-}/Co(CN)_6^{4-}$ redox pair and the third electrolyte comprises a $Co^{3+}/Co^{2+}$ redox pair.

10. The redox flow battery of claim 2, wherein the second electrolyte comprises a $Zn(OH)_4^{2-}/Zn$ redox pair, and the third electrolyte comprises a $Fe^{3+}/Fe^{2+}$ redox pair.

TABLE 2

Negative, middle and positive electrolyte choices (electrode potential from reference)

| Negative electrolyte | Middle electrolyte | Positive electrolyte |
|---|---|---|
| $[Co(CN)_6]^{3-}/[Co(CN)_6]^{4-}$ ($\phi_N = -0.83$ V) | $Na_2SO_4$ | $Co^{3+}/Co^{2+}$ ($\phi_P = 1.95$ V) |
| $[Co(EDTA)]^-/[Co(EDTA)]^{2-}$ ($\phi_N = 0.37$ V) | $NaClO_4$ | $Ce^{4+}/Ce^{3+}$ ($\phi_P = 1.74$ V) |
| $[Fe(CN)_6]^{3-}/[Fe(CN)_6]^{4-}$ ($\phi_N = 0.36$ V) | | $VO_2^+/VO^{2+}$ ($\phi_P = 1.00$ V) |
| $[Cr(CN)_6]^{3-}/[Cr(CN)_6]^{4-}$ ($\phi_N = -1.28$ V) | | $Fe^{3+}/Fe^{2+}$ ($\phi_P = 0.77$ V) |
| $Zn(OH)_4^{2-}/Zn$ ($\phi_N = -1.22$ V) | | |
| $Al(OH)_4^-/Al$ ($\phi_N = -2.34$ V) | | |

11. The redox flow battery of claim 2, wherein the first electrode is a negative electrode and the second electrode is a positive electrode; or wherein the first electrode is a positive electrode and the second electrode is a negative electrode.

12. The redox flow battery of claim 1, wherein the first electrode is a negative electrode and the second electrode is a positive electrode; or wherein the first electrode is a positive electrode and the second electrode is a negative electrode.

13. The redox flow battery of claim 1, wherein the second electrolyte comprises an anion-based redox pair or a cation-based redox pair.

14. The redox flow battery of claim 1, wherein the second electrolyte comprises an $Al(OH)_4^-/Al$ redox pair, a $Zn(OH)_4^{2-}/Zn$ redox pair or a $Co(CN)_6^{3-}/Co(CN)_6^{4-}$ redox pair.

15. The redox flow battery of claim 1, wherein the third electrolyte comprises an anion-based redox pair or a cation-based redox pair.

16. The redox flow battery of claim 1, wherein the third electrolyte comprises a $Co^{3+}/Co^{2+}$ redox pair or a $Ce^{4+}/Ce^{3+}$ redox pair.

17. The redox flow battery of claim 1, wherein the second electrolyte comprises an $Al(OH)_4^-/Al$ redox pair and the third electrolyte comprises a $Co^{3+}/Co^{2+}$ redox pair.

18. The redox flow battery of claim 1, wherein the second electrolyte comprises a $Zn(OH)_4^{2-}/Zn$ redox pair and the third electrolyte comprises a $Ce^{4+}/Ce^{3+}$ redox pair.

19. The redox flow battery of claim 1, wherein the second electrolyte comprises a $Co(CN)_6^{3-}/Co(CN)_6^{4-}$ redox pair and the third electrolyte comprises a $Co^{3+}/Co^{2+}$ redox pair.

20. The redox flow battery of claim 1, wherein the second electrolyte comprises a $Zn(OH)_4^{2-}/Zn$ redox pair, and the third electrolyte comprises a $Fe^{3+}/Fe^{2+}$ redox pair.

* * * * *